US008511211B2

(12) United States Patent
Cox

(10) Patent No.: US 8,511,211 B2

(45) Date of Patent: Aug. 20, 2013

(54) POWER MITER SAW HAVING ADJUSTABLE LOWER GUARD OPERATING MECHANISM

(75) Inventor: Matthew Cox, Lake In The Hills, IL (US)

(73) Assignee: Robert Bosch GmbH, Stuttgart (DE)

( * ) Notice: Subject to any disclaimer, the term of this patent is extended or adjusted under 35 U.S.C. 154(b) by 743 days.

(21) Appl. No.: 12/414,205

(22) Filed: Mar. 30, 2009

(65) Prior Publication Data

US 2010/0242700 A1 Sep. 30, 2010

(51) Int. Cl.
*B23D 45/04* (2006.01)

(52) U.S. Cl.
USPC ................. 83/397; 83/478; 83/490; 83/471.3

(58) Field of Classification Search
USPC ......................... 83/397, 471.3, 473, 490, 478
See application file for complete search history.

(56) References Cited

U.S. PATENT DOCUMENTS

| | | | | |
|---|---|---|---|---|
| 4,581,966 A | | 4/1986 | Kaiser et al. | |
| 4,805,504 A | * | 2/1989 | Fushiya et al. | 83/397 |
| 4,934,233 A | * | 6/1990 | Brundage et al. | 83/397 |
| 5,203,245 A | | 4/1993 | Terpstra | |
| 5,609,085 A | | 3/1997 | Chang | |
| 5,893,311 A | * | 4/1999 | Huang | 83/397 |
| 5,937,720 A | * | 8/1999 | Itzov | 83/397 |
| 6,279,442 B1 | * | 8/2001 | Chang | 83/397 |

* cited by examiner

*Primary Examiner* — Kenneth E. Peterson

(74) *Attorney, Agent, or Firm* — Maginot, Moore & Beck

(57) ABSTRACT

A power miter saw of the type which has an upper fixed blade guard and a lower swinging blade guard for covering the lower reach of an installed blade when the saw is in its rest position and for exposing the lower reach of the saw blade when moved to its operational position, the saw comprising an adjustable length elongated linkage mechanism interconnecting a frame support and the lower blade guard for moving the lower blade guard in response to movement of the saw between the rest and operational positions, such that the lower blade guard covers the lower reach of the blade when the saw is in its rest position and uncovers the blade when the saw is moved to its operational position, the linkage mechanism permitting the exposure of a blade arbor to facilitate changing of the blade.

20 Claims, 5 Drawing Sheets

POWER MITER SAW HAVING ADJUSTABLE LOWER GUARD OPERATING MECHANISM

BACKGROUND OF THE INVENTION

The present invention generally relates to power miter saws and similar power saws.

The design and development of power tools and particularly power saws, such as miter saws, for example, have produced saws that are extremely sophisticated and not only provide reliable and accurate cutting of work pieces, but also are much safer to operate. Such safety considerations have greatly changed the configuration of miter saws over several decades. One of the major changes involves the protection of a user from the rotating saw blade by having not only an upper generally fixed blade guard as part of the design of the motor and blade assembly, but also a swinging lower blade guard that is pivoted out of the way to expose the blade for cutting as the motor and blade assembly is lowered into its operating position to cut a work piece. When the cut is completed and the motor and blade assembly rotated upwardly to return to its normal rest position, the lower blade guard is automatically rotated into position to cover the blade.

As is the case for some known miter saws that are currently marketed, the geometry of the miter saw prevents a lower guard from rolling back away from the saw blade for the purpose of having access to the blade arbor as required when it is desired to change the blade. The actuating link of the lower guard is connected to a frame support and does not normally permit this type of movement. For many designs, it is therefore necessary to at least partially disassemble the saw in order to obtain access to the arbor so that the blade can be changed. The amount of disassembly varies depending upon the particular saw, but is often inconvenient and time consuming.

SUMMARY OF THE INVENTION

Embodiments of the present invention permit the lower guard linkage linking mechanism to be easily manipulated to place the lower guard to be rotated out of the way and be temporarily held in a position which exposes the blade and arbor to permit the user to change the blade.

Embodiments of a power miter saw comprise a saw base having a fence for positioning a work piece, a table rotatably connected to the saw base, a miter arm assembly for angularly positioning the table relative to the saw base, a saw blade and motor assembly having a blade arbor on which a blade can be installed and a motor operatively connected to drive the arbor and installed blade; and a frame support on the table for supporting the assembly, including a horizontal shaft about which the assembly is pivotable to move a saw blade vertically between an upper rest position and a lower operational position, the assembly having an upper fixed blade guard for encasing the upper reach of an installed saw blade without encasing the blade arbor, and a lower swinging blade guard pivotally mounted to the assembly around a pivot connection generally concentric with the blade arbor for covering the lower reach of an installed blade when the assembly is in its rest position and for exposing the saw blade when moved to its operational position, the assembly comprising an elongated linkage mechanism interconnecting the frame support and the lower blade guard for moving the lower blade guard in response to movement of the assembly between the rest and operational positions, such that the lower blade guard covers the lower reach of the blade when the assembly is in its rest position and is moved to uncover the lower reach of the blade when the assembly is moved to its operational position, the linkage mechanism being configured to have an adjustable length and be placed in at least first and second positions wherein the first position enables normal movement of the assembly between its rest and operational positions, and the second position wherein the lower blade guard is raised to expose the blade arbor to facilitate changing of the blade.

DETAILED DESCRIPTION

The present invention is particularly suited for use in a power miter saw of the type which has a compound action as well as being adjustable to perform cuts at different miter angles as well as different metal angles. With the miter saw having a motor and blade assembly that is pivotable along a generally horizontal axis downwardly into contact with a work piece that is placed on a table of the miter saw and wherein the motor and blade assembly includes an upper fixed blade guard as well as a swingable (i.e., rotatable) lower blade guard that is configured to completely encase the blade so that a user cannot contact the blade when the motor and blade assembly is in its upper rest position. However, the present invention includes embodiments that are useful in other types of saws of the type which have a lower blade guard associated with them.

Figure 1:
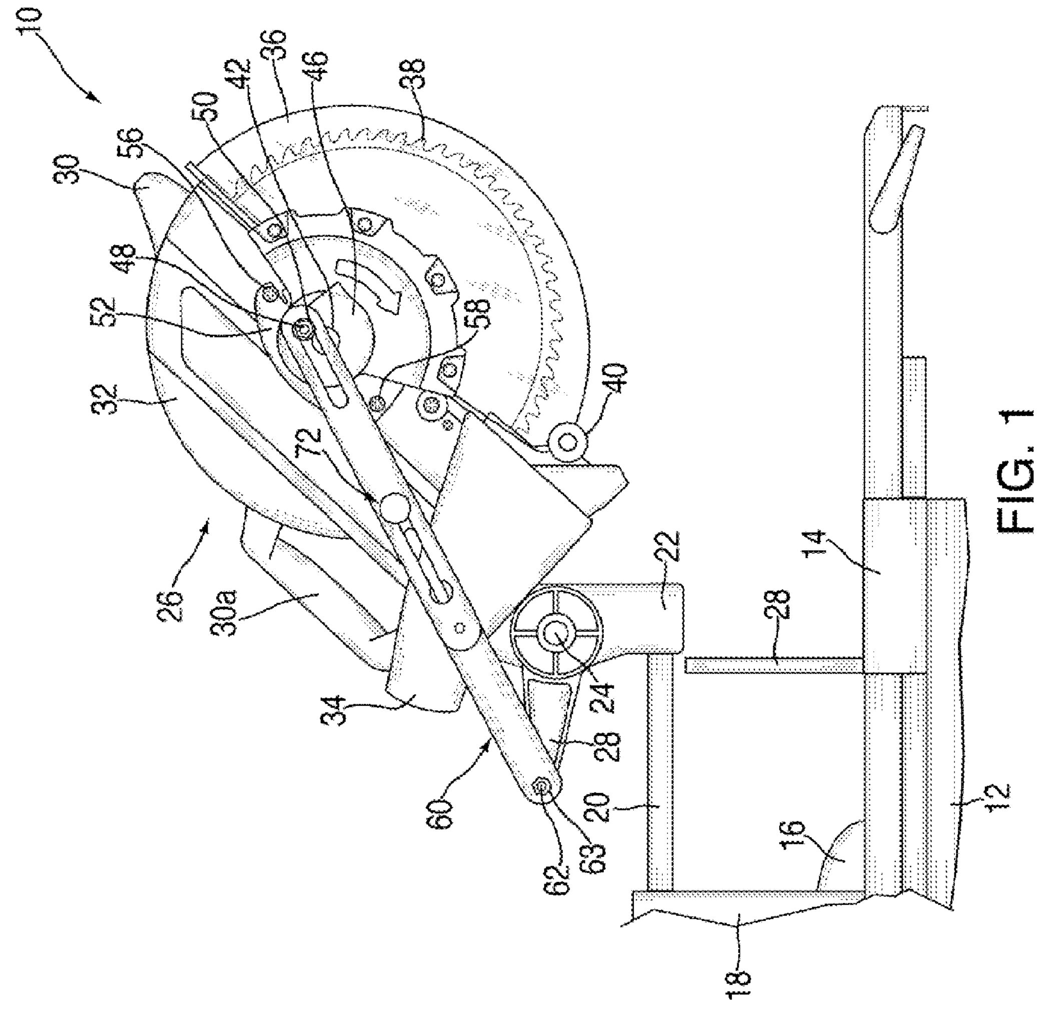
FIG. 1 is a side plan view or a portion of a compound miter saw, particularly illustrating a portion of the saw base and table and a frame support supporting a blade and motor assembly, and also illustrating a linkage mechanism for a lower swinging blade guard, with the motor and blade assembly in a rest or non-operating position.

Turning now to the drawings, and particularly FIG. 1, a compound miter saw, indicated generally at 10, that includes a partially shown base 12, a rotatable table 14 that around a hub 16 which is connected to a vertical stand 18 to which a pair of rods 20 (only one of which is visible in FIG. 1) can move horizontally to provide compound action of the saw to increase the length of cut that is possible with the saw. The forward end of the rods 20 are connected to a frame support 22 that has a horizontal shaft 24 that pivotally supports a motor and blade assembly that is indicated generally at 26. It should be understood that the present invention can also be used for a non-sliding type of miter saw.

As is typical, the table 14 has a fence 28 which is provided to anchor a work piece that may be placed on the table 14. The frame support 22 has a rearward extension 28 that is preferably integrally formed with the frame support 22. The motor and blade assembly 26 has a handle 30 as well as a carry handle portion 30*a*. The handle 30 is used by a user to pivot the motor and blade assembly 26 downwardly toward the table 14 for cutting a work piece that is positioned on the table. The motor and blade assembly 26 preferably has an upper blade guard portion that is preferably cast together with other components to include the motor (not shown), a dust collecting portion 34.

Figure 2:
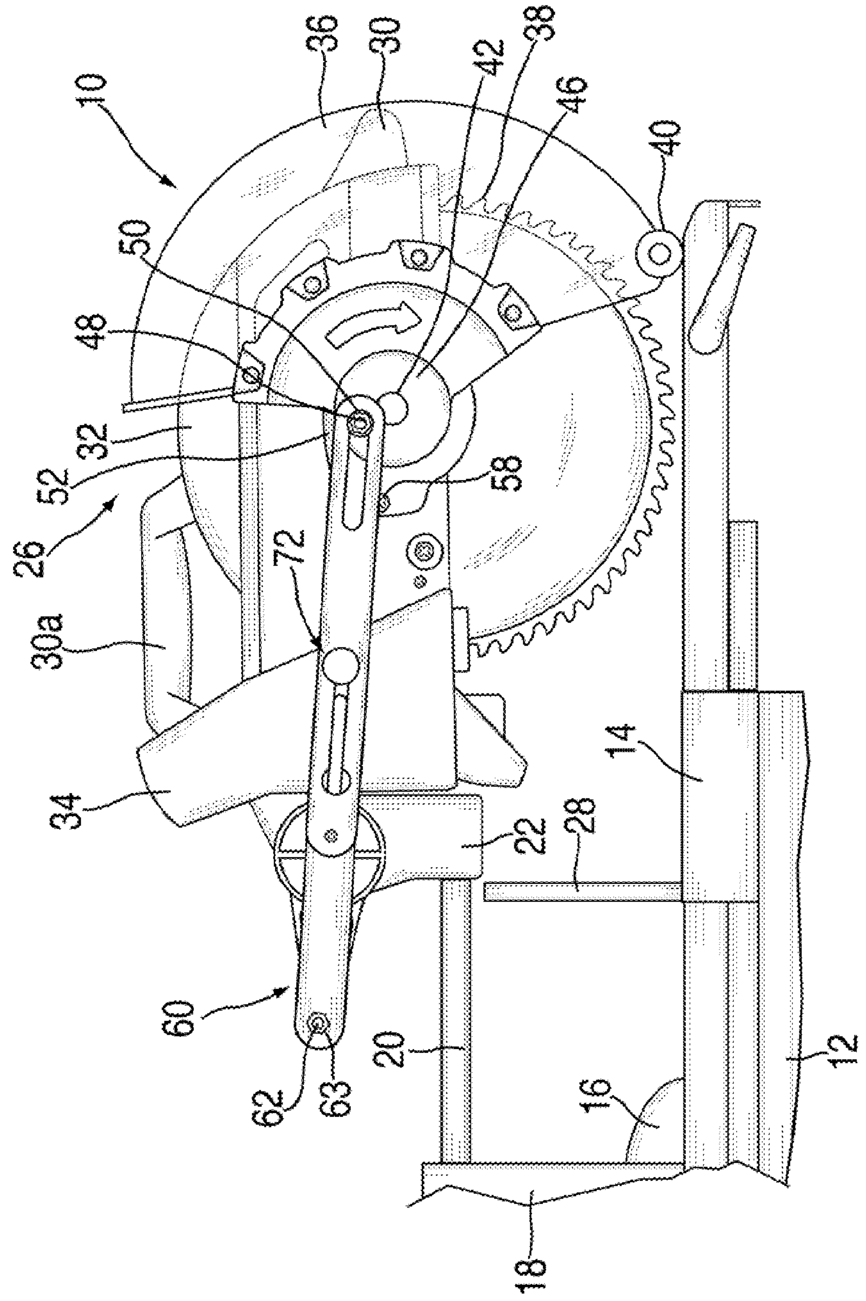
FIG. 2 is a side plan view similar to FIG. 1, but illustrating the saw with the blade and motor assembly pivoted downwardly into an operating position.

A rotatable lower blade guard 36 is shown with the blade 38 being visible, preferably because the lower blade guard 36 is formed of a transparent or nearly transparent plastic material so that a user can see if the blade 38 is moving or not. The lower blade guard 36 has a small roller 40 located on its bottom which acts as a bumper when the lower blade guard is in its rest position as shown in FIG. 1 for contacting the top surface of the table 14 when the motor and blade assembly is brought down into cutting position as shown in FIG. 2.

Figure 3:
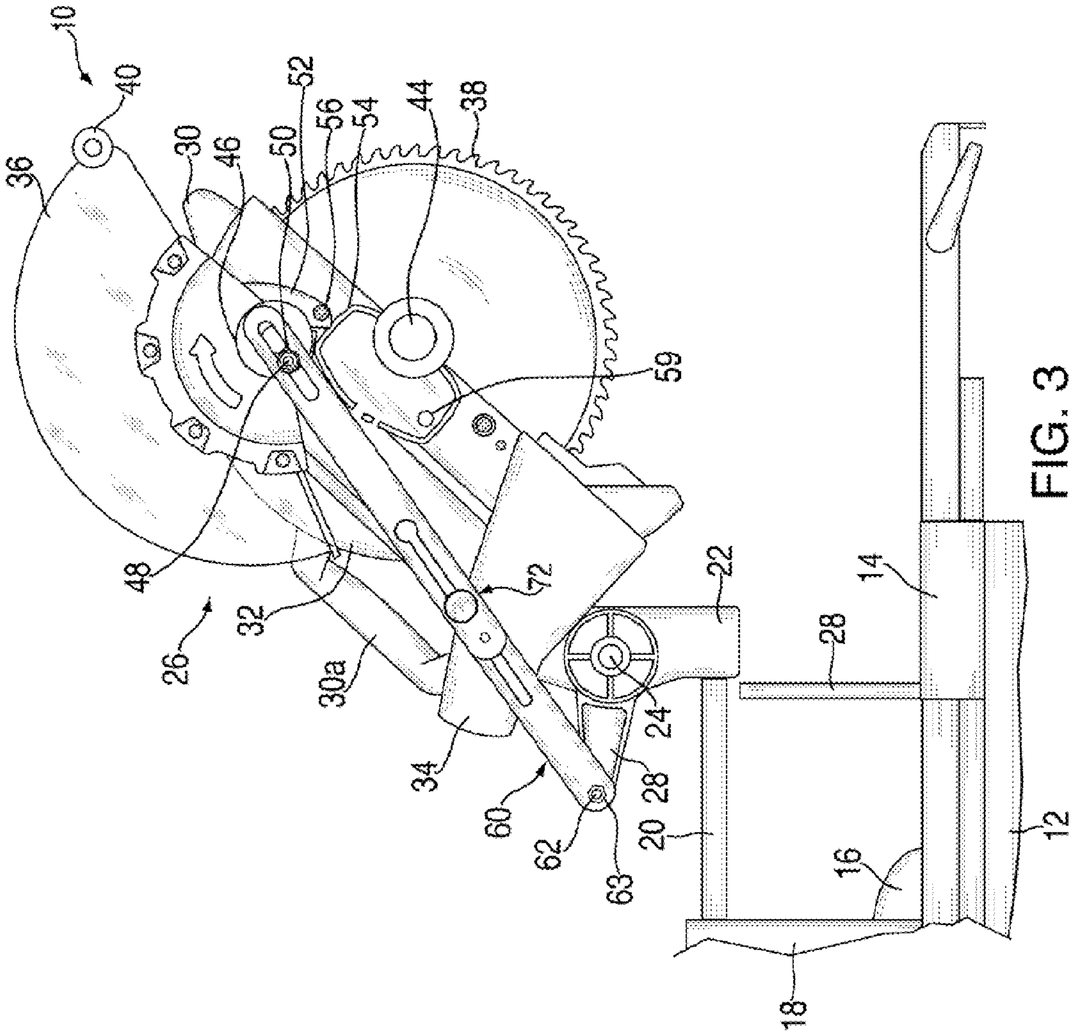
FIG. 3 is a side plan view of the saw shown in FIGS. 1 and 2, but illustrating the lower swinging blade guard pivoted to a position that exposes the blade arbor and blade thereby enabling a user to change the blade without interference from the swinging lower plate guard.

The lower blade guard pivots around an axis 42 that is generally concentric with 1 the axis of an arbor 44 (see FIG. 3) to which the blade 38 is mounted. The pivot 42, however, is secured to the upper blade guard 32 and is not attached to the arbor 44. The pivot 42 has a generally circular hub portion 46 which has a stud or bolt 48 that is preferably threaded to receive a nut 50 which defines an attachment pin for an elongated linkage mechanism, indicated generally at 60, the other end of which is connected to the rearward extension 28 by a stud or bolt 62 that has a nut 63 which defines a fixed connection point for the linkage mechanism 60. The stud 48 is attached to a flat plate 52 that is generally shaped commensurate with a raised bead 54 outline as shown in FIG. 3 that is very generally shown as being rectangular. The plate 52 has its right end portion secured in the upper blade guard by a screw 56 and its opposite end portion secured by a screw 58.

The screw 58 fits within an opening 59 in the upper blade guard 32 as is particularly shown in FIG. 3, wherein, the screw 58 has been removed from the opening 59 and the screw 56 has been loosened slightly so that the plate 52 is rotated about the screw 56 in a clockwise direction thereby enabling the lower blade guard 36 to be rotated further away from the arbor 42 thereby enabling the arbor to be accessed and the blade removed or replaced if desired.

As is shown by comparing FIGS. 1 with 2, when the motor and blade assembly 26 is in its rest position shown in FIG. 1 where the blade is elevated relative to the table, the linkage mechanism 60 is positioned to have the lower blade guard 36 positioned as shown where it totally encloses the blade 38. However, when the handle 30 is moved downwardly to bring the blade in near contact with the upper surface of the table 14, the linkage mechanism 60, by virtue of the connection 48, rotates the lower blade assembly in a clockwise direction so that the blade is exposed and is enabled to cut a work piece (not shown).

As is evident from FIGS. 1 and 2 showing the motor and blade assembly in the uppermost rest position and in an operating lower position, respectively, it is apparent that the arbor is covered by the lower blade assembly.

Figure 4:
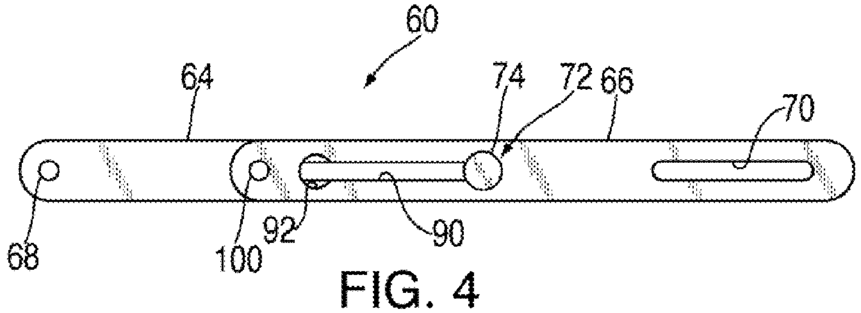
FIG. 4 is a front view of the linkage mechanism shown in FIGS. 1-3, and is shown in its retracted position.
Figure 5:
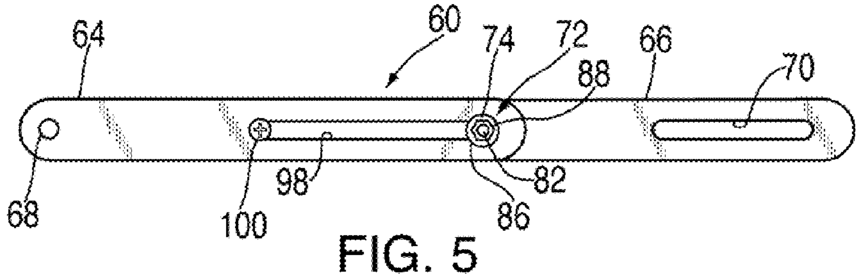
FIG. 5 is a back view of the linkage mechanism shown in FIG. 4 and is also shown in the retracted position.
Figure 6:
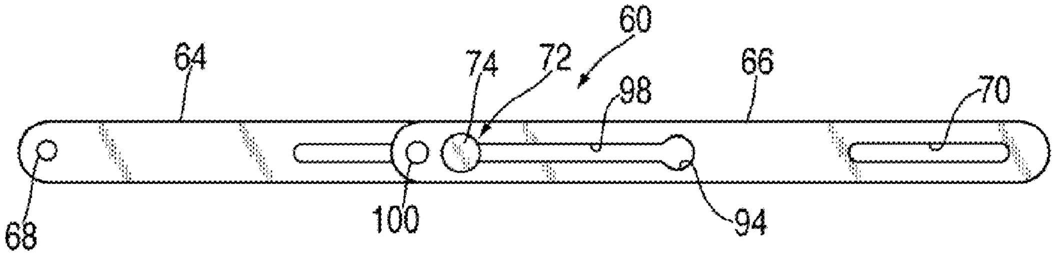
FIG. 6 is a front view of the linkage mechanism shown in FIGS. 4 and 5, but is shown in its extended position.

The elongated linkage mechanism 60 is configured to be adjustable in length and as shown in FIGS. 4, 5 and 6, and is fabricated of two elongated thin metal links 64 and preferably made of steel. The links 64 and 66 are slideable relative to one another in their longitudinal direction and the left link 64 has an opening 68 at its outer left end portion that is configured to receive a bolt or pivot pin 62 and the right link 66 has an elongated connection slot 70 which houses the bolt or stud 48 that is connected to the plate 52 and also to the lower blade guard 36. The links 64 and 66 are connected with a releasable locking pin mechanism, indicated generally at 72, that interacts with both links and can be manipulated to be releasable which enables the two links to slide relative to one another.

Figure 7:
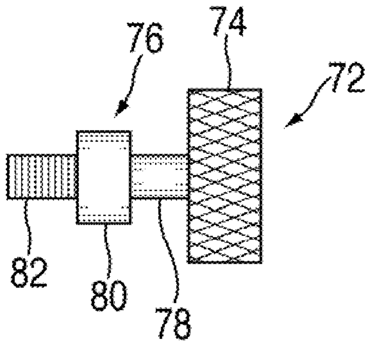
FIG. 7 is a side plan view of a portion of the locking pin mechanism.
Figure 8:
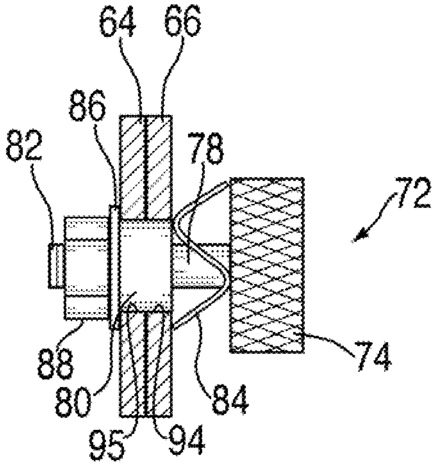
FIG. 8 is another side view of the locking pin mechanism, shown in a locked position with first and second links being shown in section.
Figure 9:
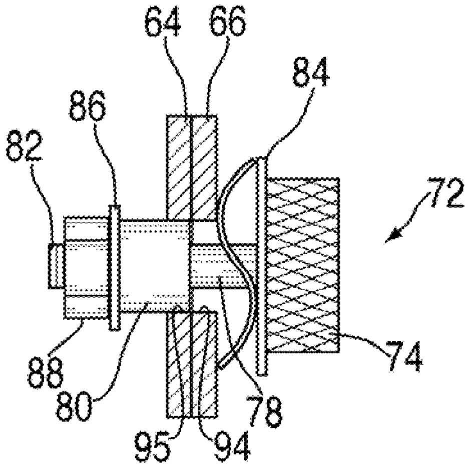
FIG. 9 is a side plan view similar to FIG. 8, but shown in an unlocked position permitting the links to be slidable relative to one another in their longitudinal direction.

The locking pin mechanism 72 is shown in detail in FIGS. 7, 8 and 9 and it comprises a head portion 74 that is preferably cylindrically shaped, together with a shank, indicated generally at 76, with the shank having a narrow preferably cylindrical shaped portion 78 having a length that is slightly larger than the thickness of the link 66 which merges with a larger diameter portion 80, which in turn is connected to a threaded end portion 82. It is preferred that the shank 76, which comprises head portion 74, enlarged portion 80 and threaded end portion 82 be integrally formed as a single piece that is preferably made of steel or aluminum.

As shown in FIG. 8, the locking pin mechanism 72 also has a spring 84 which is shown as a wave washer but can be a compression spring if desired. The threaded end portion 82 is shown to have a washer 86 and nut 88 attached thereto.

Referring to FIG. 4, the right link 66 has a travel slot 90 that extends a distance of approximately two inches and has a width that is slightly larger than the diameter of the narrow portion 78 of the locking pin mechanism 72. The opposite ends of the travel slot have enlarged portions 92 and 94 which are sized slightly larger than the outside diameter of the enlarged portion 80 of the locking pin mechanism 72. As shown in FIG. 8, the left link 64 has an opening 95 substantially the same size as the openings 92 and 94 so that when the locking pin mechanism is in place as shown in FIG. 8, the enlarged portion fits within the opening 95 in the link 64 and in one of the enlarged portions 92 or 94 and locks the two links together so that they cannot slide relative to one another.

When a user pushes the head 74 toward the link 66, the enlarged portion 80 will be released from the enlarged opening in the link 66 so that the portion 78 will be coextensive with the travel slot 90 and enable the links 64, 66 to move from the retracted position shown in FIG. 4, for example, to the extended position shown in FIG. 6. A rear view of the linkage mechanism 60 is shown in FIG. 5 and in this view it is evident that the link 64 has an elongated slot 98 in which an alignment pin 100 can travel, with the alignment pin being connected to the link 66. This limits the sliding movement of the two links 64, 66 relative to one another in the longitudinal direction and prohibits any angular positioning of the links relative to one another.

Figure 10:
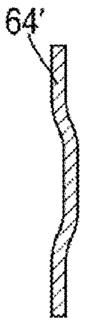
FIG. 10 is a cross-sectional view of an alternative embodiment of one of the elongated links.
Figure 11:
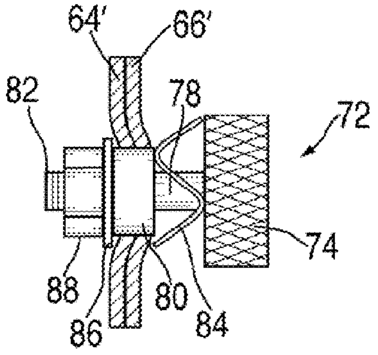
FIG. 11 is a view similar to FIG. 8, but illustrating the alternative configuration of the elongated links.

While the use of the alignment pin 100 shown in the preferred embodiment, it should be understood that an alternative embodiment can be used which is shown in FIGS. 10 and 11 wherein the cross sectional configuration of the links 64*a* and 66*a* is other than flat and therefore similarly limits sliding movement only in the longitudinal direction. It should be understood that other mechanisms such as an outer bracket that fits around both of the links could be used to limit sliding movement only in the longitudinal direction. If such a bracket were used, then the alignment slot 98 and the alignment pin 100 would be unnecessary. It should also be understood that other alternatives could be used to limit sliding movement only in the longitudinal direction, such as a separate stamped or molded member that covers both links and prevents rotation of them relative to one another.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power miter saw comprising:

a saw base having a fence for positioning a work piece;

a table rotatably connected to said saw base;

a miter arm assembly for angularly positioning said table relative to said saw base;

a saw blade and motor assembly having a blade arbor on which a blade can be installed and a motor operatively connected to drive said arbor and installed blade; and a frame support on said table for supporting said assembly, including a horizontal shaft about which said assembly is pivotable to move a saw blade vertically between an upper rest position and a lower operational position;

said assembly having an upper fixed blade guard for encasing upper areas of an installed saw blade without encasing said blade arbor, and a lower swinging blade guard pivotally mounted to said assembly around a pivot connection generally concentric with said blade arbor for fully covering an installed blade when said assembly is in its rest position and for exposing the saw blade when moved to its operational position;

said assembly comprising an elongated linkage mechanism interconnecting said frame support and said lower blade guard for moving the lower blade guard in response to movement of said assembly between said rest and operational positions, such that the lower blade guard covers said exposed lower reach of the blade when said assembly is in its rest position and is moved to uncover the lower reach of the blade when the assembly is moved to its operational position;

said linkage mechanism including a first elongated link having an elongated alignment slot at a forward end portion, a second elongated link having an elongated travel slot in a rearward end portion generally parallel to said alignment slot, and a locking pin mechanism configured to be received in said alignment slot and said travel slot for slidably interconnecting said first and second links;

wherein said first and second elongated links are slidable relative to one another in the longitudinal direction, so that said linkage mechanism has an adjustable length and is configurable to be placed in at least first and second positions wherein said first position enables normal movement of said assembly between its rest and operational positions, and said second position wherein said lower blade guard is raised to expose said blade arbor to facilitate changing of the blade.

2. A power miter saw as defined in claim 1 wherein said linkage mechanism is configured to be locked in either of said first and second positions.

3. A power miter saw as defined in claim 2 wherein one end of said first link is connected to one of said frame support and said lower blade guard and said second link is connected to the other of said frame support and said lower blade guard, and said locking mechanism releasably locks said linkage mechanism in either of said first and second positions.

4. A power miter saw as defined in claim 1 wherein each of said first and second links have a cross sectional configuration that is non planar to limit slidability of said first and second links relative to one another in said longitudinal direction.

5. A power miter saw as defined in claim 1 wherein said first elongated link has an opening in a rearward end portion configured to receive a first pin for attaching said first link to said frame support.

6. A power miter saw as defined in claim 5 wherein said second elongated link has an elongated attachment slot in a forward end portion configured to receive an attachment pin for operatively interconnecting said second link to said lower blade guard.

7. A power miter saw as defined in claim 6 further comprising a generally flat plate for holding said attachment pin for operatively interconnecting said second link to said lower blade guard, said flat plate being removably attached to said upper blade guard at two or more positions so that said plate can be rotated on said upper blade guard when only attached at one position, thereby enabling said attachment pin and lower blade guard to be moved an additional distance from said arbor.

8. A power miter saw as defined in claim 7 wherein said plate is attached to said upper blade guard with screws at opposite end portions thereof.

9. A power miter saw as defined in claim 6 wherein said second elongated link has an alignment pin that engages said alignment slot in said first elongated link, said alignment pin limiting sliding movement of said first and second links relative to one another in the longitudinal direction of said first and second links.

10. A power miter saw as defined in claim 1 wherein said first and second elongated links are made of steel.

11. A power miter saw as defined in claim 1 wherein said elongated travel slot has a predetermined slot width and opposite end enlarged portions, said locking pin mechanism being configured to selectively engage said enlarged opposite end portions and prevent sliding of said first and second links relative to each other.

12. A power miter saw as defined in claim 11 wherein said locking pin mechanism comprises an outer head portion connected to a shank portion with a narrow portion immediately adjacent to said head portion sized to fit within said travel slot, a larger portion adjacent said narrow portion sized to fit within either of said enlarged opposite end portions, and a free end portion adjacent said larger portion configured to have a retaining member to retain said locking pin mechanism attached to said links, said locking pin mechanism being configured to lock said links in either a retracted position or an extended position when said larger shank portion engages respective enlarged opposite end portions and to permit sliding movement of said links relative to one another when said narrow shank portion is coextensive with said travel slot between said opposite end enlarged portions.

13. A power miter saw as defined in claim 12 wherein said locking pin mechanism further comprises a spring configured to bias said head portion outwardly away from said links.

14. A power miter saw as defined in claim 13 wherein said spring is a wave washer.

15. A power miter saw as defined in claim 12 wherein said free end portion of said shank portion is threaded and said retaining member is a nut threaded on said threaded free end portion.

16. A power miter saw as defined in claim 15 wherein said narrow portion of said shank portion is generally cylindrical in shape and has a length slightly greater than the thickness of said second elongated link.

17. A power miter saw as defined in claim 16 wherein said first link has an opening positioned to receive said larger portion of said shank portion, said locking pin mechanism further comprising a washer adjacent said larger portion of said shank portion and having an outer diameter greater than said larger portion of said shank portion, said washer being held by said nut.

18. A power miter saw comprising:

a saw base having a fence for positioning a work piece;

a table rotatably connected to said saw base;

a miter arm assembly for angularly positioning said table relative to said saw base;

a saw blade and motor assembly having a blade arbor on which a blade can be installed and a motor operatively connected to drive said arbor and installed blade; and a frame support on said table for supporting said assembly, including a horizontal shaft about which said assembly is pivotable to move a saw blade vertically between an upper rest position and a lower operational position;

said assembly having an upper fixed blade guard for encasing upper reach of an installed saw blade without encasing said blade arbor, and a lower swinging blade guard pivotally mounted to said assembly around a pivot connection generally concentric with said blade arbor for covering the lower reach of an installed blade when said assembly is in its rest position and for exposing the lower reach of the saw blade when moved to its operational position;

said assembly comprising an elongated linkage mechanism interconnecting said frame support and said lower blade guard for moving the lower blade guard in response to movement of said assembly between said rest and operational positions, such that the lower blade guard covers said exposed lower reach of the blade when said assembly is in its rest position and is moved to uncover the lower reach of the blade when the assembly is moved to its operational position;

said linkage mechanism including a first elongated link having an elongated alignment slot at a forward end portion, a second elongated link having an elongated travel slot in a rearward end portion generally parallel to said alignment slot, and a locking pin mechanism configured to be received in said alignment slot and said travel slot for slidably interconnecting said first and second links;

wherein said first and second elongated links are slidable relative to one another in the longitudinal direction, so that a length of said linkage mechanism is variable between a retracted and an extended position, said linkage mechanism when placed in said extended position permitting said lower blade guard to be rotated upwardly and be retained to expose said blade arbor to facilitate changing of the blade without said assembly being moved from said rest to said operation position.

19. A power miter saw as defined in claim 18 wherein said locking pin mechanism is for selectively locking said linkage mechanism in one of said retracted and extended positions.

20. A power miter saw having a saw assembly movable between an upper rest position and a lower operational position, said saw assembly having a saw blade installed on a blade arbor, an upper fixed blade guard encasing upper areas of the installed saw blade without encasing the blade arbor, and a lower swinging blade guard fully covering the installed blade when the saw assembly is in its rest position and exposing the saw blade when the saw assembly is moved to its operational position, the power miter saw further comprising:

an elongated linkage mechanism interconnecting a frame support and the lower blade guard for moving the lower blade guard in response to movement of the saw between the rest and operating positions, such that the lower blade guard covers the exposed lower reach of the blade when the saw is in its rest position and uncovers the blade when the saw is moved to its operational position;

said linkage mechanism including a first elongated link having an elongated alignment slot at a forward end portion, a second elongated link having an elongated travel slot in a rearward end portion generally parallel to said alignment slot, and a locking pin mechanism configured to be received in said alignment slot and said travel slot for slidably interconnecting said first and second links;

wherein said first and second elongated links are slidable relative to one another in the longitudinal direction, so that said linkage mechanism is configured to have an adjustable length and be placed in at least first and second positions wherein the first position enables normal movement of the saw between its rest and operating positions, and the second position wherein the lower blade guard is raised to expose a blade arbor to facilitate changing of the blade.

* * * * *